US012576651B2

(12) United States Patent
Motai et al.

(10) Patent No.: US 12,576,651 B2
(45) Date of Patent: Mar. 17, 2026

(54) TAPE PRINTING APPARATUS AND CONTROL METHOD OF TAPE PRINTING APPARATUS

(71) Applicant: SEIKO EPSON CORPORATION, Tokyo (JP)

(72) Inventors: Kenji Motai, Matsumoto (JP); Keisuke Taruya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 194 days.

(21) Appl. No.: 18/605,347

(22) Filed: Mar. 14, 2024

(65) Prior Publication Data

US 2024/0308250 A1 Sep. 19, 2024

(30) Foreign Application Priority Data

Mar. 15, 2023 (JP) ................................ 2023-040509

(51) Int. Cl.

| | |
|---|---|
| ***B41J 11/00*** | (2006.01) |
| ***B41J 11/04*** | (2006.01) |
| ***B41J 11/70*** | (2006.01) |
| ***B41J 15/04*** | (2006.01) |

(52) U.S. Cl.

CPC ............ *B41J 11/0095* (2013.01); *B41J 11/04* (2013.01); *B41J 11/703* (2013.01); *B41J 15/042* (2013.01); *B41J 15/044* (2013.01)

(58) Field of Classification Search

CPC ....... B41J 11/0095; B41J 11/04; B41J 11/703; B41J 15/042; B41J 15/044; B41J 3/4075; B41J 13/00; B41J 13/0009; B41J 15/00; B41J 15/04; B41J 15/046

See application file for complete search history.

(56) References Cited

U.S. PATENT DOCUMENTS

| | | | | |
|---|---|---|---|---|
| 2018/0022110 | A1 | 1/2018 | Sasaki | |
| 2018/0264844 | A1 | 9/2018 | Sasaki | |
| 2019/0283455 | A1 | 9/2019 | Ozawa | |
| 2022/0203725 | A1 * | 6/2022 | Murayama | B41J 11/703 |

FOREIGN PATENT DOCUMENTS

| | | | | |
|---|---|---|---|---|
| JP | 2012-179882 | A | 9/2012 | |
| JP | 2020015183 | * | 7/2018 | B41J 3/4075 |
| JP | 2018-140644 | A | 9/2018 | |
| JP | 2019-119173 | A | 7/2019 | |
| JP | 2019-155787 | A | 9/2019 | |
| JP | 2022142104 | * | 3/2021 | B41J 3/4075 |

* cited by examiner

*Primary Examiner* — Kristal Feggins

(74) *Attorney, Agent, or Firm* — OLIFF PLC

(57) ABSTRACT

A tape printing apparatus acquires a printing start command, and when a margin distance, which is a distance from a leading end of a tape to a printing start position of the tape, is shorter than a sensor-head distance, which is a distance between a detection position and a printing position, and the leading end of the tape is located in a second feeding direction with respect to the detection position, the tape printing apparatus feeds the tape in a first feeding direction, locates the leading end of the tape in the first feeding direction with respect to the detection position by a predetermined distance, feeds the tape in the second feeding direction, determines that the leading end of the tape passed the detection position, and then feeds the tape in the second feeding direction until the printing start position of the tape comes to the printing position.

6 Claims, 17 Drawing Sheets

TAPE PRINTING APPARATUS AND CONTROL METHOD OF TAPE PRINTING APPARATUS

The present application is based on, and claims priority from JP Application Serial Number 2023-040509, filed Mar. 15, 2023, the disclosure of which is hereby incorporated by reference herein in its entirety.

BACKGROUND

1. Technical Field

The present disclosure relates to a tape printing apparatus and a control method of a tape printing apparatus.

2. Related Art

In the related art, as disclosed in JP-A-2019-155787, a printing apparatus including a drive motor, a platen drive shaft that rotates a platen roller, a gear train mechanism that transmits power of the drive motor to the platen drive shaft, a printing head that performs printing on a tape, and a sensor that has a detection position located downstream of a printing position by the printing head and detects the presence or absence of the tape is known. When a printing start command is acquired, this type of printing apparatus performs the following control when the tape is not detected by the sensor, that is, when a leading end of the tape is located upstream of the detection position. When the printing apparatus acquires the printing start command, the tape is fed in a forward feeding direction, the leading end of the tape is detected by the sensor in a period in which the tape is fed in the forward feeding direction, the tape is fed in a backward feeding direction until a printing start position of the tape comes to the printing position by the printing head, and then driving of the printing head is started.

In the printing apparatus disclosed in JP-A-2019-155787, due to the influence of the backlash of the gear train mechanism when a feeding direction of the tape is switched from the forward feeding direction to the backward feeding direction, that is, when the drive motor is switched from the forward rotation to the backward rotation, the printing start position of the tape may be shifted from the printing position by the printing head. In this case, the printing apparatus makes an error in a distance of a front margin, which is a margin in the forward feeding direction of the tape.

SUMMARY

According to an aspect of the present disclosure, provided is a tape printing apparatus including: a drive motor that rotates in a first rotation direction and a second rotation direction opposite to the first rotation direction; a platen drive shaft that engages with a platen roller and rotates the platen roller; a gear train mechanism that transmits power of the drive motor to the platen drive shaft so that the platen roller feeds a tape in a first feeding direction when the drive motor rotates in the first rotation direction, and the platen roller feeds the tape in a second feeding direction opposite to the first feeding direction when the drive motor rotates in the second rotation direction; a printing head that performs printing on the tape fed in the first feeding direction; a sensor that has a detection position located in the first feeding direction with respect to a printing position by the printing head and detects presence or absence of the tape at the detection position; and a control section that controls the drive motor and the printing head, in which the control section acquires a printing start command, and when a margin distance, which is a distance from a leading end of the tape to a printing start position of the tape, is shorter than a sensor-head distance, which is a distance between the detection position and the printing position, and the leading end of the tape is located in the second feeding direction with respect to the detection position, the control section feeds the tape in the first feeding direction, locates the leading end of the tape in the first feeding direction with respect to the detection position by a predetermined distance, feeds the tape in the second feeding direction, determines that the leading end of the tape passed the detection position, and then feeds the tape in the second feeding direction until the printing start position of the tape comes to the printing position.

According to another aspect of the present disclosure, provided is a control method of a tape printing apparatus including: a drive motor that rotates in a first rotation direction and a second rotation direction opposite to the first rotation direction; a platen drive shaft that engages with a platen roller and rotates the platen roller; a gear train mechanism that transmits power of the drive motor to the platen drive shaft so that the platen roller feeds a tape in a first feeding direction when the drive motor rotates in the first rotation direction, and the platen roller feeds the tape in a second feeding direction opposite to the first feeding direction when the drive motor rotates in the second rotation direction; a printing head that performs printing on the tape fed in the first feeding direction; and a sensor that has a detection position located in the first feeding direction with respect to a printing position by the printing head and detects presence or absence of the tape at the detection position, the control method including: causing the tape printing apparatus to acquire a printing start command and to, when a margin distance, which is a distance from a leading end of the tape to a printing start position of the tape, is shorter than a sensor-head distance, which is a distance between the detection position and the printing position, and the leading end of the tape is located in the second feeding direction with respect to the detection position, feed the tape in the first feeding direction, locates the leading end of the tape in the first feeding direction with respect to the detection position by a predetermined distance, feed the tape in the second feeding direction, determine that the leading end of the tape passed the detection position, and then feed the tape in the second feeding direction until the printing start position of the tape comes to the printing position.

DESCRIPTION OF EMBODIMENTS

Hereinafter, a tape printing apparatus and a control method of a tape printing apparatus will be described with reference to the accompanying drawings. It should be noted that the description will be made by using directions based on an XYZ orthogonal coordinate system in a part of drawings. However, these directions are merely for convenience of description and do not limit the following embodiment in any way.

Figure 1:
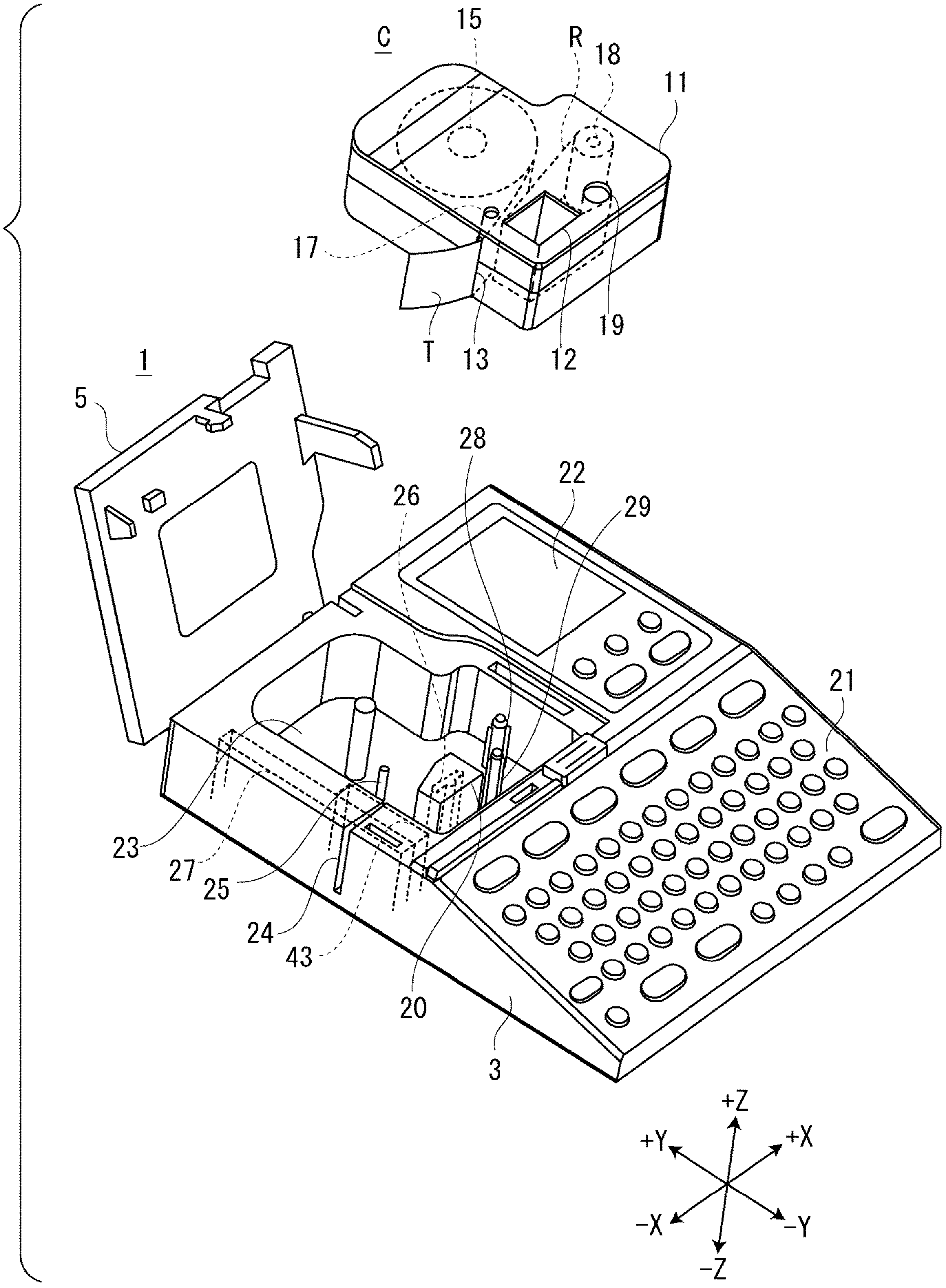
FIG. 1 is an external view of a tape printing apparatus and a tape cartridge.

FIG. 1 is an external view of a tape printing apparatus 1 and a tape cartridge C. The tape printing apparatus 1 is an apparatus that performs printing on a long tape T. The tape printing apparatus 1 according to the present embodiment uses, as the tape T, a tape in which a printing tape on which the printing is performed and a release paper tape used as a release paper are superimposed.

The tape printing apparatus 1 includes an apparatus case 3 and a mounting section cover 5. An operation key group 21, a display 22, a cartridge mounting section 23, and a tape ejection port 24 are provided on a surface of the apparatus case 3 in a +Z direction.

The operation key group 21 receives various operations of a user, such as an editing operation of a printed image printed on the tape T. The display 22 displays various information, such as an editing screen of the printed image. The tape printing apparatus 1 generates printed data based on the editing operation of the printed image by the user, and performs a printing process based on the generated printed data.

The cartridge mounting section 23 is a recess portion that is open in the +Z direction. The tape cartridge C is detachably mounted on the cartridge mounting section 23. The mounting section cover 5 is rotatably attached to an end portion of the apparatus case 3 in a +Y direction, and opens and closes the cartridge mounting section 23.

The tape cartridge C includes a tape core 15, a platen roller 17, a feeding-out core 18, and a winding core 19, and a cartridge case 11 that accommodates these components.

The tape T is wound around the tape core 15. The ink ribbon R is wound around the feeding-out core 18. The ink ribbon R fed out from the feeding-out core 18 is wound around the winding core 19. A head insertion hole 12 is provided through the cartridge case 11 in a Z axis direction. Further, a tape sending-out port 13 extending in the Z axis direction is provided on a surface of the cartridge case 11 in a −X direction. The tape T fed out from the tape core 15 is sent out of the cartridge case 11 from the tape sending-out port 13.

The cartridge mounting section 23 is provided with a printing head 26 and a head cover 20. The printing head 26 performs the printing on the tape T. The head cover 20 partially covers the printing head 26.

From a bottom surface of the cartridge mounting section 23, the platen drive shaft 25, a feeding-out shaft 28, and a winding shaft 29 protrude in the +Z direction. When the tape cartridge C is mounted on the cartridge mounting section 23, the platen drive shaft 25, the feeding-out shaft 28, and the winding shaft 29 engage with the platen roller 17, the feeding-out core 18, and the winding core 19, respectively.

In addition, when the tape cartridge C is mounted on the cartridge mounting section 23, the printing head 26 and the head cover 20 are inserted into the head insertion hole 12. Subsequently, when the mounting section cover 5 is closed, the printing head 26 is moved toward the platen roller 17 by a head movement mechanism (not illustrated). As a result, the tape T and the ink ribbon R are interposed between the printing head 26 and the platen roller 17.

Figure 4:
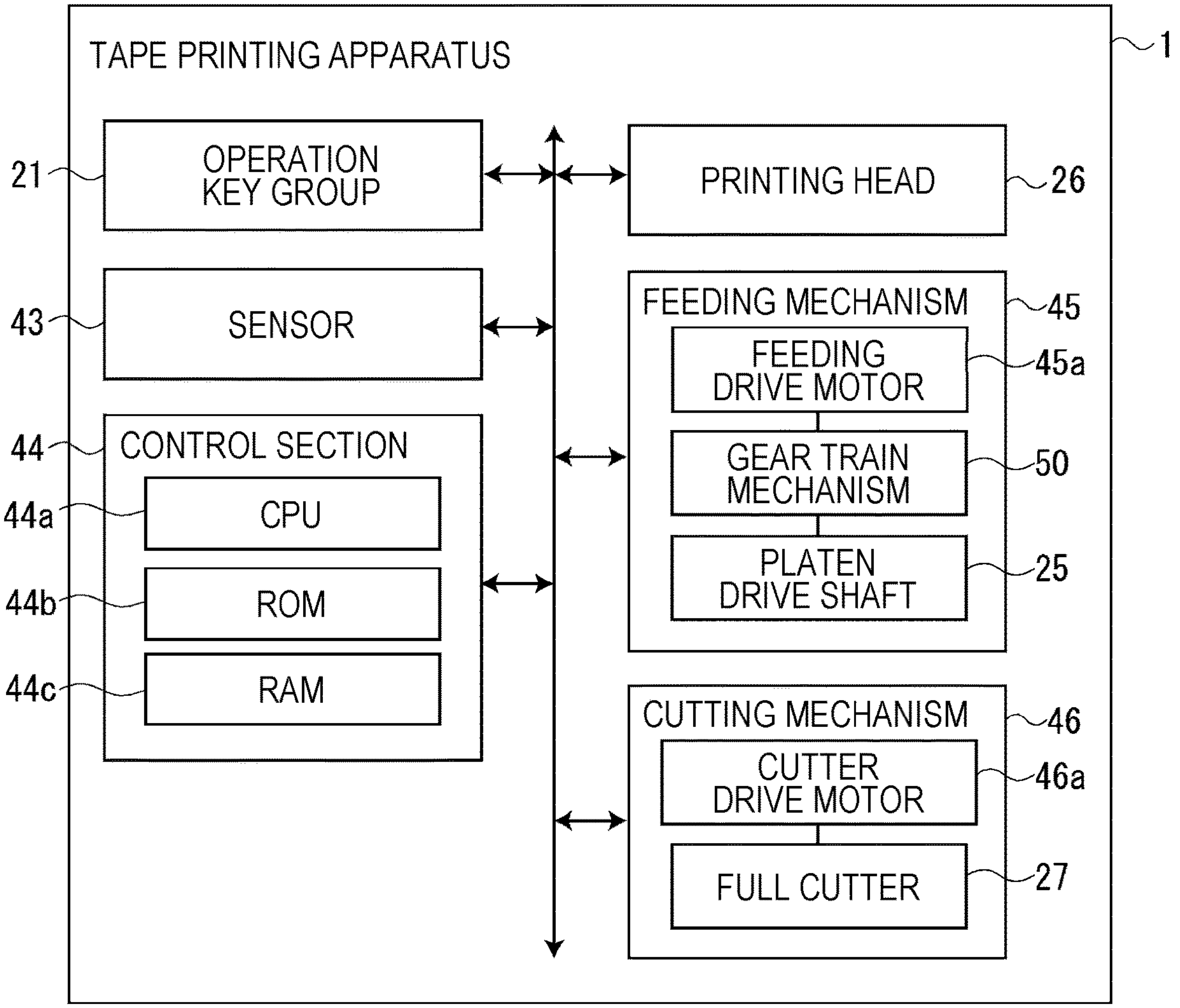
FIG. 4 is a block diagram illustrating a hardware configuration of the tape printing apparatus.

In this state, when a feeding drive motor 45*a* provided in the tape printing apparatus 1 illustrated in FIG. 4 rotates in a first rotation direction, the platen roller 17 and the winding core 19 rotate so that the tape T is sent out of the cartridge case 11 from the tape sending-out port 13 and the ink ribbon R is wound around the winding core 19. It should be noted that the tape T in this case is fed in the −X direction toward the tape ejection port 24. The −X direction is an example of a "first feeding direction". In addition, when the feeding drive motor 45*a* rotates in a second rotation direction opposite to the first rotation direction, the platen roller 17 and the feeding-out core 18 rotate so that the tape T is pulled back into the cartridge case 11 and the ink ribbon R is wound back around the feeding-out core 18. It should be noted that the tape T in this case is fed in the +X direction. The +X direction is an example of a "second feeding direction".

The printing head 26 generates heat in accordance with the printed data when the tape T is fed in the −X direction. As a result, the ink of the ink ribbon R is transferred to the tape T, and the printed image based on the printed data is printed on the tape T. The tape T on which the printing is performed is ejected from the tape ejection port 24.

Figure 2:
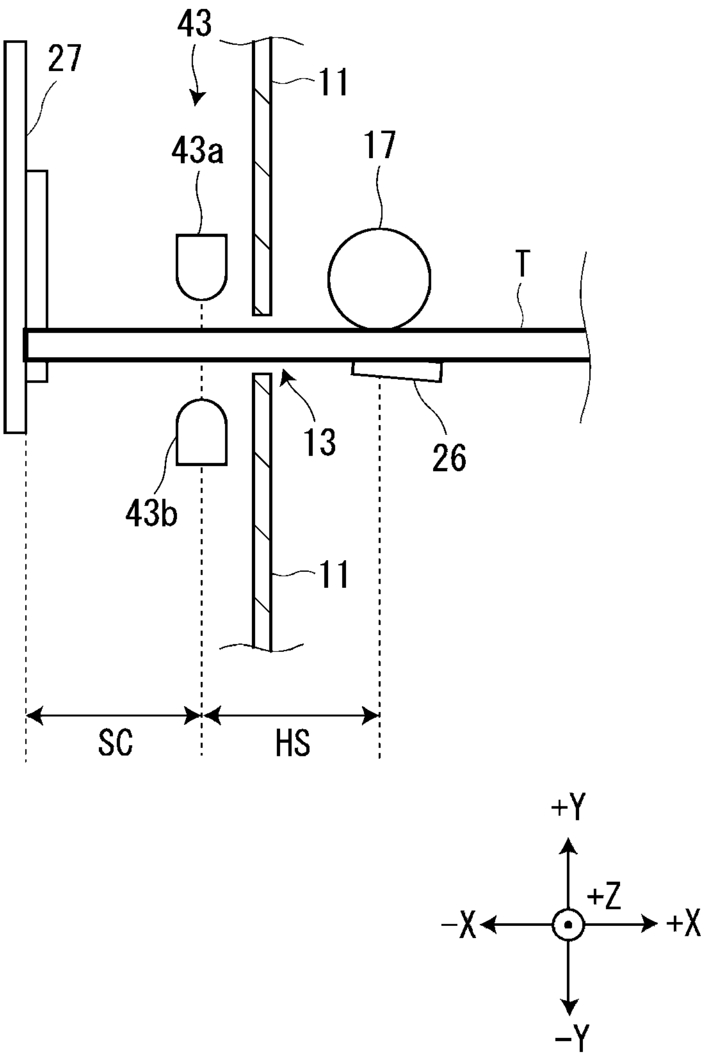
FIG. 2 is a diagram illustrating a disposition of a printing head, a sensor, and a cutter.

As illustrated in FIG. 2, a sensor 43 and a full cutter 27 are provided between the cartridge mounting section 23 and the tape ejection port 24. The full cutter 27 is an example of a "cutter". The sensor 43 detects the presence or absence of the tape T. The full cutter 27 cuts the tape T in the Z axis direction, that is, in a tape width direction. Accordingly, a printed portion of the tape T is cut away.

FIG. 2 is a diagram illustrating the disposition of the printing head 26, the sensor 43, and the full cutter 27. FIG. 2 illustrates the disposition of each member in a state in which the tape cartridge C is mounted on the cartridge mounting section 23. Therefore, the platen roller 17 accommodated in the cartridge case 11 of the tape cartridge C is disposed at a position facing the printing head 26 with the tape T interposed therebetween.

As illustrated in FIG. 2, A detection position of the sensor 43 is located in the −X direction with respect to a printing position by the printing head 26. The sensor 43 includes a light emission section 43*a* and a light reception section 43*b* provided at a position facing the light emission section 43*a* with the tape T interposed therebetween. It should be noted that, in the following description, a distance between the detection position of the sensor 43 and the printing position by the printing head 26 in the X axis direction will be referred to as a "sensor-head distance HS". In addition, in the following description, a distance between the detection position of the sensor 43 and a cutting position by the full cutter 27 in the X axis direction will be referred to as a "sensor-cutter distance SC".

Incidentally, in general, the printed portion of the tape T is cut at the termination of the printing process, and thus the leading end of the tape T is normally located at the cutting position of the full cutter 27. However, depending on a usage status of the tape cartridge C, the leading end of the tape T may be located in the +X direction with respect to the detection position of the sensor 43. For example, it is conceivable that the user extracts the tape cartridge C from the cartridge mounting section 23 and cuts the tape T with scissors near the tape sending-out port 13 of the cartridge case 11.

As described above, since the leading end of the tape T is not always located at the cutting position of the full cutter 27, the tape printing apparatus 1 determines whether or not the leading end of the tape T is located in the +X direction with respect to the detection position based on the detection result of the sensor 43. Specifically, the tape printing apparatus 1 determines that the leading end of the tape T is located in the +X direction with respect to the detection position when the sensor 43 is in a light receiving state, and determines that the leading end of the tape T is located in the −X direction with respect to the detection position when the sensor 43 is in a light blocking state. Hereinafter, the fact that the sensor 43 is in the light receiving state will be referred to as "the tape T is not detected by the sensor 43". In addition, the fact that the sensor 43 is in the light blocking state means that "the tape T is detected by the sensor 43".

Figure 3:
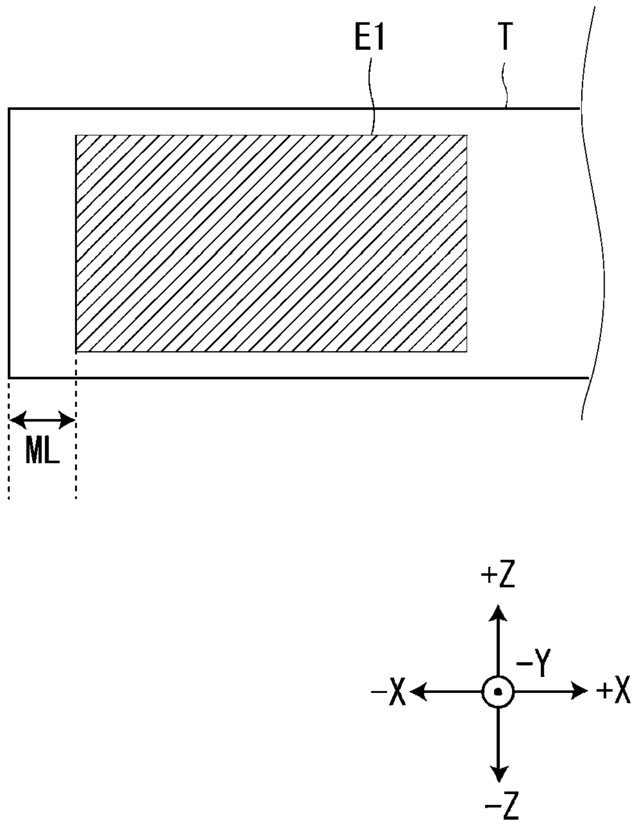
FIG. 3 is a diagram illustrating an example of a tape.

FIG. 3 is a diagram illustrating an example of the tape T. In FIG. 3, a shaded portion on the tape T indicates a printing target area E1. The printing target area E1 means an area in which the printing is performed by the printing head 26. The printing target area E1 is a rectangular area surrounding the printed image printed on the tape T. Specifically, when the minimum coordinate of the printed image in the X axis direction is "X_min", the maximum coordinate in the X axis direction is "X_max", the minimum coordinate in the Z axis direction is "Z_min", and the maximum coordinate in the Z axis direction is "Z_max", the printing target area E1 has a rectangular range having (X_min, Z_min), (X_min, Z_max), (X_max, Z_min), and (X_max, Z_max) as the vertices.

It should be noted that, in the following description, a distance from the leading end of the tape T, which is an end portion of the tape T in the −X direction, to an end portion of the printing target area E1 in the −X direction will be referred to as a "margin distance ML". The end portion of the printing target area E1 in the −X direction is an example of a "printing start position of the tape".

With reference to FIG. 4, a hardware configuration of the tape printing apparatus 1 will be described. The tape printing apparatus 1 includes the operation key group 21, the sensor 43, a control section 44, the printing head 26, a feeding mechanism 45, and a cutting mechanism 46.

The operation key group 21 includes a printing key in addition to a character key and a number key. The printing key is a key for the user to give an instruction to start the printing.

The sensor 43 detects the presence or absence of the tape T at the detection position in a period in which the tape T is fed by the feeding mechanism 45. The sensor 43 illustrated in FIG. 2 is a transmissive sensor including a light emission section 43*a* and a light reception section 43*b*. In the present embodiment, the sensor 43 is used to discriminate whether the leading end of the tape T is located in the +X direction or the −X direction with respect to the detection position and whether or not the leading end of the tape T has passed the detection position.

The control section 44 includes a central processing unit (CPU) 44*a*, a read only memory (ROM) 44*b*, and a random access memory (RAM) 44*c*.

The CPU 44*a* performs various types of control by deploying and executing control programs, such as firmware stored in the ROM 44*b*, in the RAM 44*c*. It should be noted that the control section 44 may use a hardware circuit, such as an ASIC, as a processor instead of the CPU 44*a*. The processor may be configured such that one or more CPUs and the hardware circuit, such as the ASIC, operate in cooperation with each other.

The printing head 26 includes a heat generating element group (not illustrated), and performs the printing by thermally transferring the ink from the ink ribbon R to the tape T. The heat generating element group includes a plurality of heat generating elements arranged in the Z axis direction.

The feeding mechanism 45 includes the feeding drive motor 45*a*, a gear train mechanism 50, and the platen drive shaft 25. The feeding drive motor 45*a* is an example of a "drive motor". The feeding drive motor 45*a* rotates in the first rotation direction and the second rotation direction opposite to the first rotation direction. The gear train mechanism 50 includes a plurality of gears and transmits power of the feeding drive motor 45*a* to the platen drive shaft 25. The platen drive shaft 25 engages with the platen roller 17 and rotates the platen roller 17.

It should be noted that, in the present embodiment, the feeding drive motor 45*a* is a stepping motor. The control section 44 controls a feeding amount of the tape T based on the number of steps for rotating the feeding drive motor 45*a*.

The gear train mechanism 50 transmits the power of the feeding drive motor 45*a* to the platen drive shaft 25 so that the platen roller 17 feeds the tape T in the −X direction when the feeding drive motor 45*a* rotates in the first rotation direction and the platen roller 17 feeds the tape T in the +X direction when the feeding drive motor 45*a* rotates in the second rotation direction.

The cutting mechanism 46 includes a cutter drive motor 46*b* and the full cutter 27. The cutter drive motor 46*b* is a drive source that drives the full cutter 27. When the cutter drive motor 46*b* is driven, the full cutter 27 operates to cut the tape T in the Z axis direction.

Figure 5:
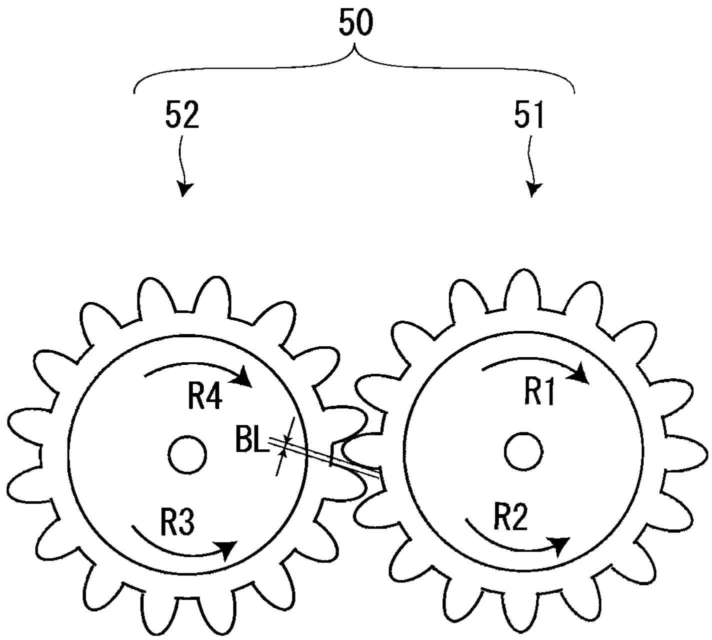
FIG. 5 is a diagram illustrating an example of a gear train mechanism.

With reference to FIG. 5, the gear train mechanism 50 will be described. As illustrated in FIG. 5, the gear train mechanism 50 includes a first gear 51 and a second gear 52. The first gear 51 is a driving-side gear to which power is input from the feeding drive motor 45*a*. The second gear 52 is a driven-side gear to which power is input from the first gear 51.

For example, when the feeding drive motor 45*a* rotates in the first rotation direction, the first gear 51 rotates in a rotation direction R1 and the second gear 52 rotates in a rotation direction R3. When the feeding drive motor 45*a* rotates in the second rotation direction, the first gear 51 rotates in a rotation direction R2, and the second gear 52 rotates in a rotation direction R4.

A slight gap called backlash BL is provided between tooth surfaces of the first gear 51 and the second gear 52. The backlash BL is a clearance between the tooth surfaces for smoothly rotating a pair of meshing gears. As described above, since the backlash BL is provided between the tooth surfaces of the gears, when the rotation direction of the feeding drive motor 45*a* is switched, there is a deviation between the feeding amount of the tape T in the design based on the number of driving steps of the feeding drive motor 45*a* and an actual feeding amount of the tape T.

Therefore, the tape printing apparatus 1 according to the present embodiment performs control for suppressing that the printing start position of the tape T is shifted due to the influence of the backlash BL of the gear train mechanism 50 when the rotation direction of the feeding drive motor 45*a* is switched. Specifically, when the margin distance ML is shorter than the sensor-head distance HS and the leading end of the tape T is located in the +X direction with respect to the detection position of the sensor 43, the tape printing apparatus 1 acquires a printing start command, and then performs the following control in feeding control of aligning the printing start position of the tape T with the printing position by the printing head 26. In this case, the tape printing apparatus 1 needs to feed the tape T in the −X direction until the leading end of the tape T comes to the detection position of the sensor 43, and then feed the tape T in the +X direction for cueing. That is, in the feeding control, the tape printing apparatus 1 needs to switch the feeding drive motor 45*a* from the first rotation direction to the second rotation direction, but the tape printing apparatus 1 determines that the leading end of the tape T has passed the detection position of the sensor 43 after the rotation direction is switched, instead of before the rotation direction is switched.

Accordingly, the tape printing apparatus 1 can accurately align the printing start position of the tape T with the printing position by the printing head 26 without being affected by the backlash BL generated when the rotation direction of the feeding drive motor 45*a* is switched. Accordingly, the tape printing apparatus 1 can suppress an error in the margin distance ML of the tape T, as illustrated in FIG. 3. Hereinafter, the control of suppressing that the printing start position of the tape T is shifted will be described in detail. It should be noted that the gear train mechanism 50 illustrated in FIG. 5 is an example, and is not limited to the configuration including two gears, and may have a configuration including three or more gears.

Figure 10:
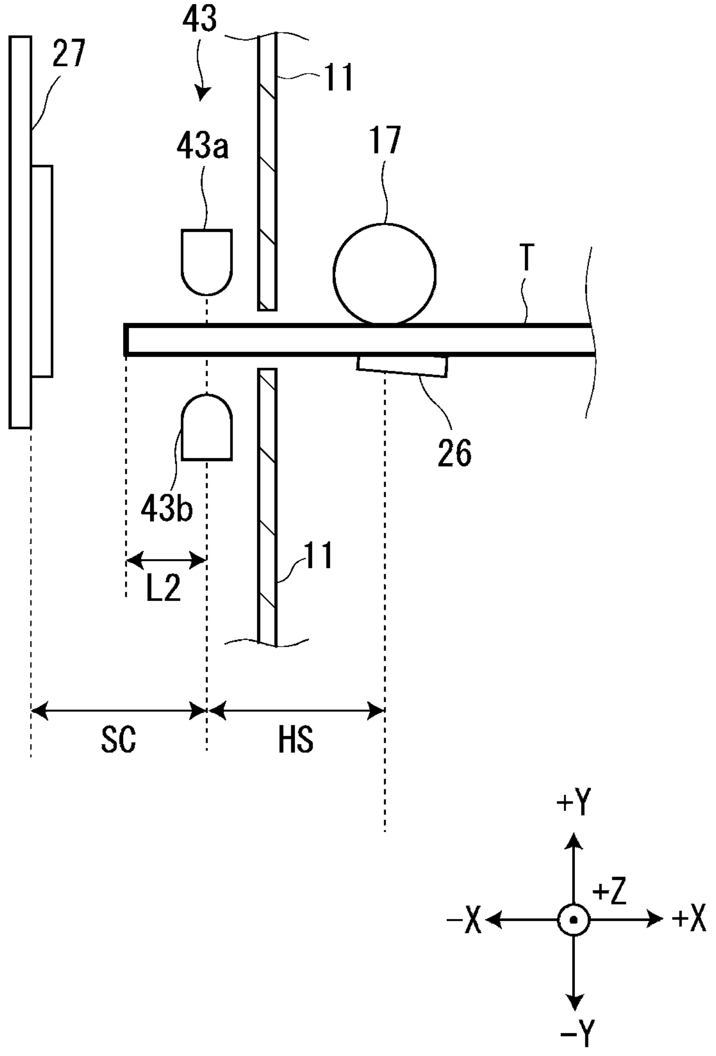
FIG. 10 is a diagram illustrating a state in which the tape is fed in the −X direction by a second distance from the state in FIG. 9.

Here, a function of the control section 44 in the configuration of the tape printing apparatus 1 illustrated in FIG. 4 will be described. The control section 44 acquires the printing start command and performs the following feeding control when the margin distance ML is shorter than the sensor-head distance HS, and the leading end of the tape T is located in the +X direction with respect to the detection position. As illustrated in FIG. 10, the control section 44 feeds the tape T in the −X direction, locates the leading end of the tape T in the −X direction with respect to the detection position by a second distance L2 (L2>0), feeds the tape T in the +X direction, determines that the leading end of the tape T has passed the detection position, and then feeds the tape T in the +X direction until the printing start position of the tape T comes to the printing position.

It should be noted that, as illustrated in FIG. 4, the control section 44 acquires the printing start command by the user operating the printing key included in the operation key group 21. In addition, the margin distance ML is a distance calculated by the control section 44 based on the printed data when the printing start command is acquired. In addition, the sensor-head distance HS is information stored in the ROM 44*b*. In addition, the second distance L2 is an example of a “predetermined distance”. The second distance L2 is a fixed value and is a distance shorter than the sensor-cutter distance SC.

Figure 12:
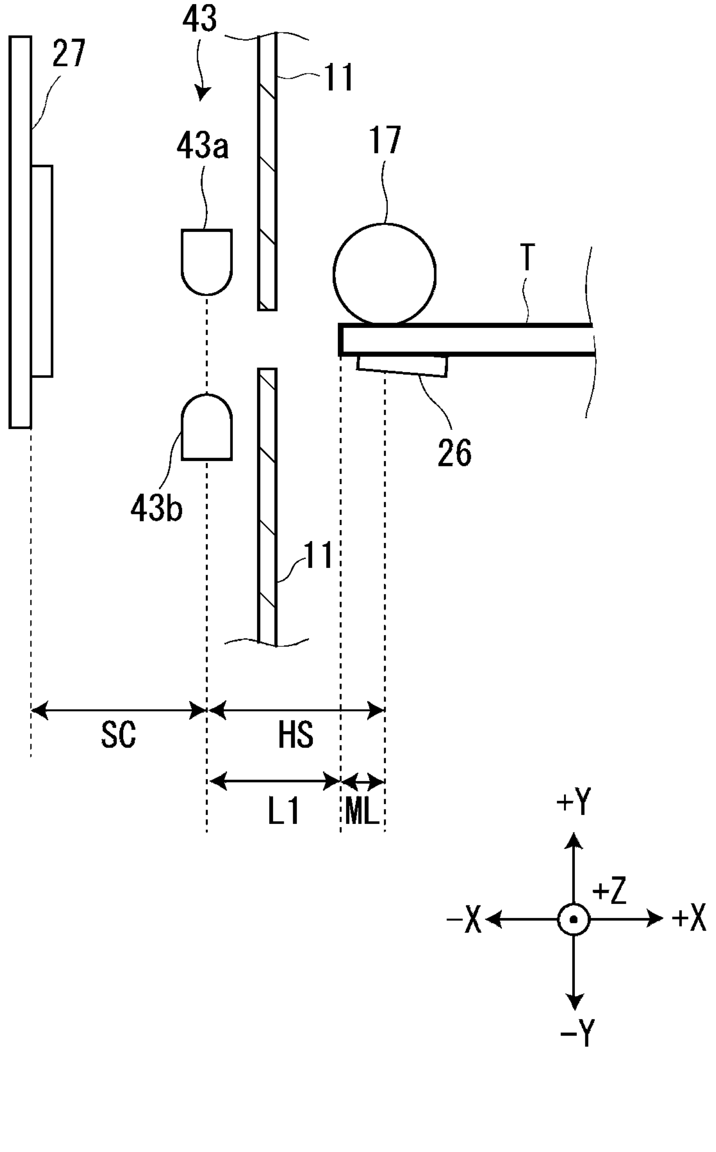
FIG. 12 is a diagram illustrating a state in which the tape is fed in the +X direction by a first distance from the state in FIG. 11.

It should be noted that, as illustrated in FIG. 12, the control section 44 feeds the tape T in the +X direction, determines that the leading end of the tape T has passed the detection position, and then feeds the tape T in the +X direction by a first distance L1 (L1≥0), thereby aligning the printing start position of the tape T with the printing position. The first distance L1 is a length obtained by subtracting the margin distance ML from the sensor-head distance HS illustrated in FIG. 2.

In addition, the control section 44 acquires the printing start command and does not feed the tape T in the −X direction when the margin distance ML is shorter than the sensor-head distance HS, and the leading end of the tape T is located in the −X direction with respect to the detection position. In this case, after the printing start command is acquired, the control section 44 feeds the tape T in the +X direction, determines that the leading end of the tape T has passed the detection position, and then feeds the tape T in the +X direction until the printing start position of the tape T comes to the printing position.

Figure 6:
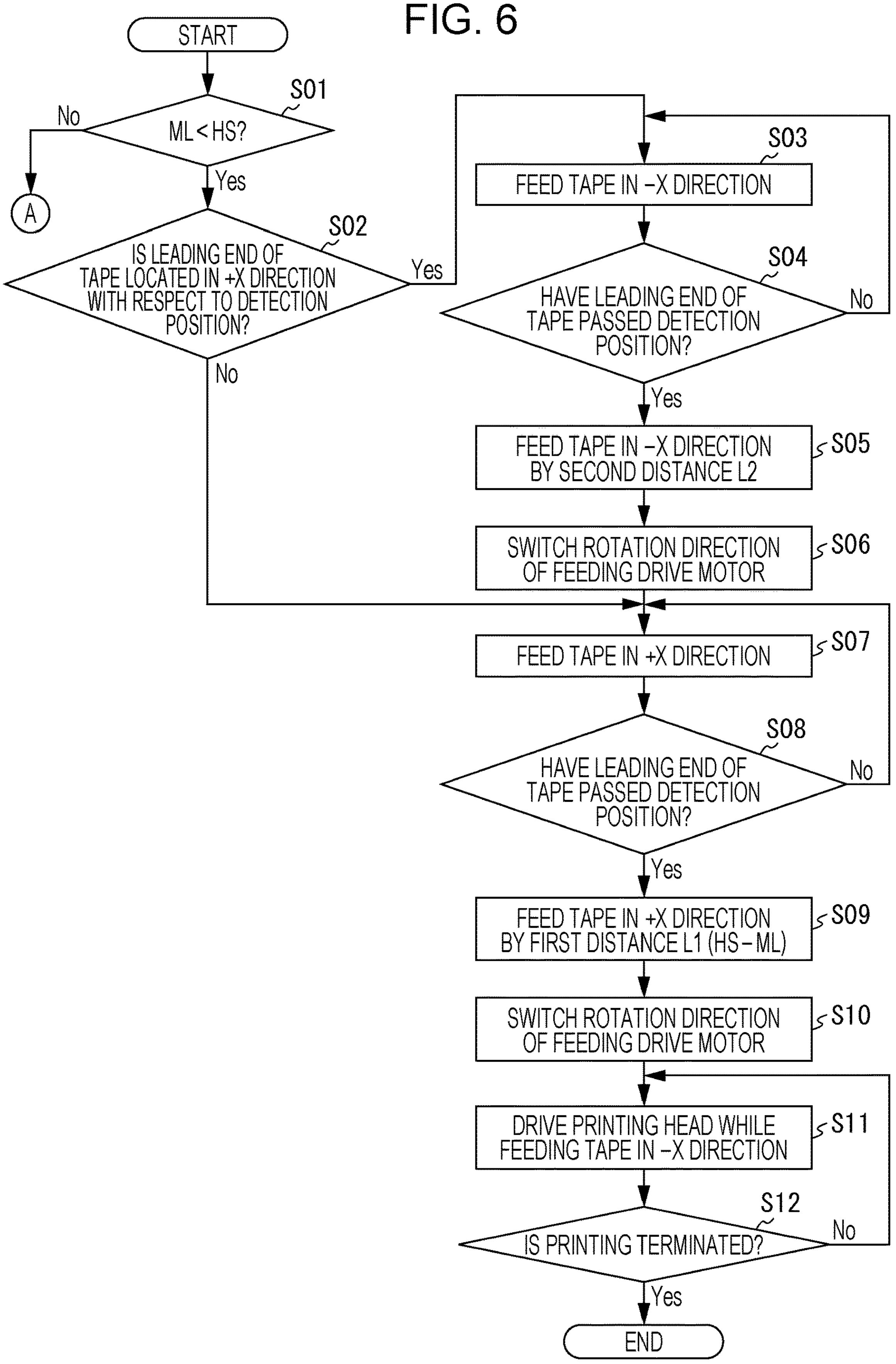
FIG. 6 is a flowchart illustrating a printing process.

Next, a flow of the printing process of the tape printing apparatus 1 will be described with reference to flowcharts of FIGS. 6 and 7. The printing process of the tape printing apparatus 1 is an example of a “control method of a tape printing apparatus”. The printing process is started when the control section 44 acquires the printing start command. As described above, when the printing start command is acquired, the control section 44 generates the printed data based on an editing result of the printed image by the user. The printing process illustrated below is executed based on this printed data.

In step S01, the control section 44 discriminates whether or not the margin distance ML is shorter than the sensor-head distance HS. When the control section 44 determines that the margin distance ML is shorter than the sensor-head distance HS, the control section 44 proceeds to step S02. In addition, when the control section 44 determines that the margin distance ML is not shorter than the sensor-head distance HS, the control section 44 proceeds to step S21 in FIG. 7.

Figure 8:
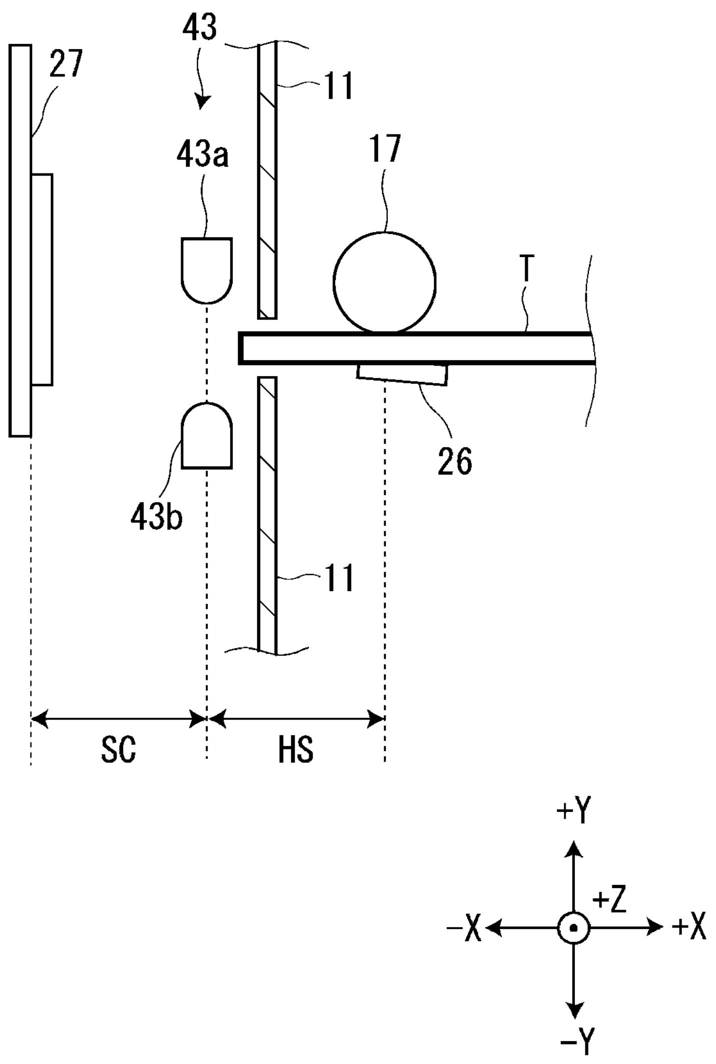
FIG. 8 is a diagram illustrating a state in which a leading end of the tape is located in a +X direction with respect to a detection position.
Figure 13:
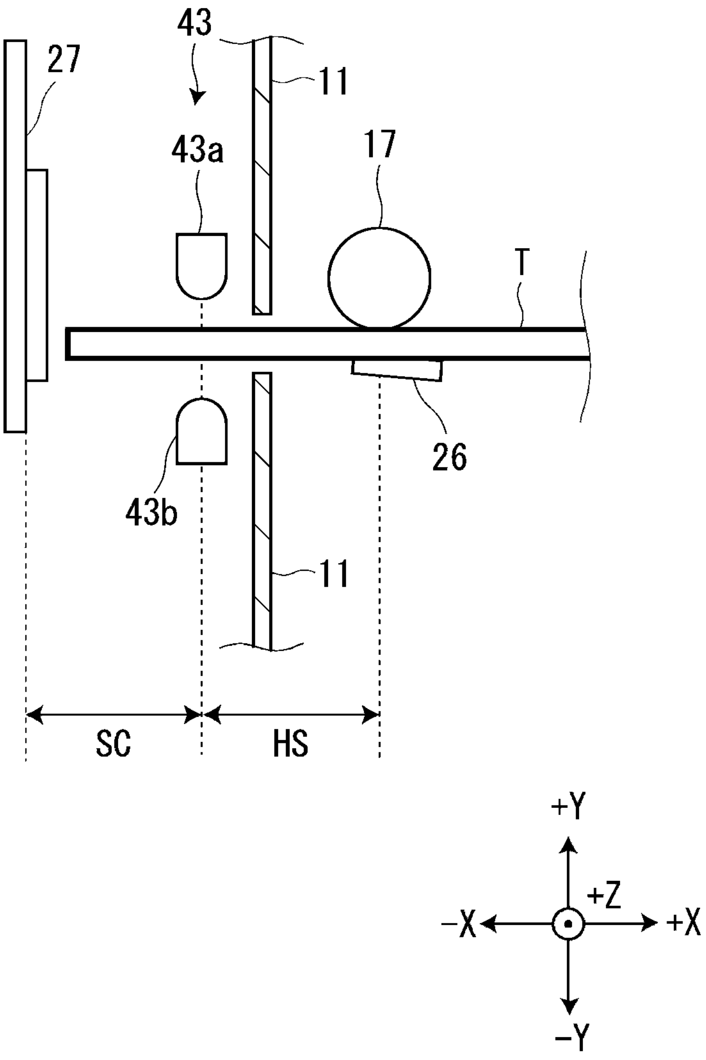
FIG. 13 is a diagram illustrating a state in which the leading end of the tape is located in the −X direction with respect to the detection position.

In step S02, the control section 44 discriminates whether or not the leading end of the tape T is located in the +X direction with respect to the detection position. The control section 44 determines that the leading end of the tape T is located in the +X direction with respect to the detection position when the tape T is not detected by the sensor 43, and determines that the leading end of the tape T is not located in the +X direction with respect to the detection position when the tape T is detected by the sensor 43. FIG. 8 is a diagram illustrating a state in which the leading end of the tape T is located in the +X direction with respect to the detection position, and FIG. 13 is a diagram illustrating a state in which the leading end of the tape T is not located in the +X direction with respect to the detection position, that is, the leading end of the tape T is located in the −X direction with respect to the detection position. When the control section 44 determines that the leading end of the tape T is located in the +X direction with respect to the detection position, the control section 44 proceeds to step S03. In addition, when the control section 44 determines that the leading end of the tape T is not located in the +X direction with respect to the detection position, the control section 44 proceeds to step S07.

In step S03, the control section 44 feeds the tape T in the −X direction. The control section 44 rotates the feeding drive motor 45*a* in the first rotation direction to feed the tape T in the −X direction.

Figure 9:
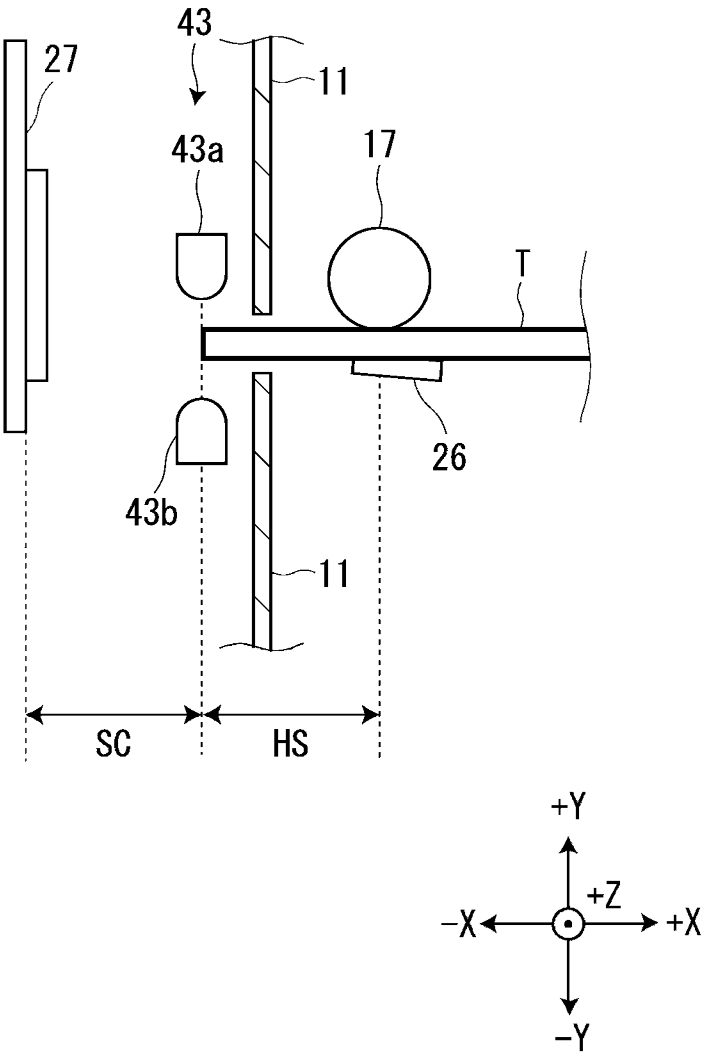
FIG. 9 is a diagram illustrating a state when the tape is fed in a −X direction from the state in FIG. 8 and the leading end of the tape has passed the detection position.

In step S04, the control section 44 discriminates whether or not the leading end of the tape T has passed the detection position. Here, when the detection result of the sensor 43 is changed from "there is no tape" to "there is a tape", the control section 44 determines that the leading end of the tape T has passed the detection position. FIG. 9 is a diagram illustrating a state when the leading end of the tape T has passed the detection position. When the control section 44 determines that the leading end of the tape T has passed the detection position, the control section 44 proceeds to step S05. In addition, when the control section 44 determines that the leading end of the tape T has not passed the detection position, the control section 44 returns to step S03.

In step S05, the control section 44 feeds the tape T in the −X direction by the second distance L2. FIG. 10 is a diagram illustrating a state in which the tape T is fed in the −X direction by the second distance L2 from a point in time when it is determined that the leading end of the tape T illustrated in FIG. 9 has passed the detection position. The second distance L2 is a fixed value.

In step S06, the control section 44 switches the rotation direction of the feeding drive motor 45*a*. Here, the control section 44 switches the rotation direction of the feeding drive motor 45*a* from the first rotation direction to the second rotation direction.

In step S07, the control section 44 feeds the tape T in the +X direction.

Figure 11:
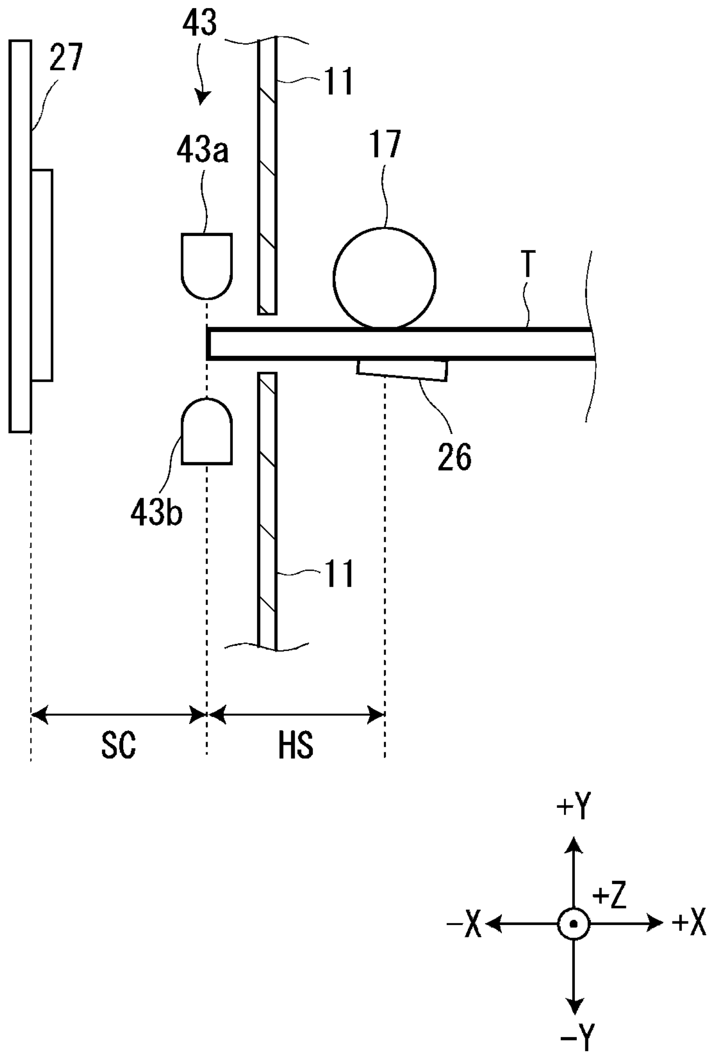
FIG. 11 is a diagram illustrating a state when the tape is fed in the +X direction from the state in FIG. 10 and the leading end of the tape has passed the detection position.

In step S08, the control section 44 discriminates whether or not the leading end of the tape T has passed the detection position. Here, when the detection result of the sensor 43 is changed from "there is a tape" to "there is no tape", the control section 44 determines that the leading end of the tape T has passed the detection position. FIG. 11 is a diagram illustrating a state when the leading end of the tape T has passed the detection position. When the control section 44 determines that the leading end of the tape T has passed the detection position, the control section 44 proceeds to step S09. In addition, when the control section 44 determines that the leading end of the tape T has not passed the detection position, the control section 44 returns to step S07.

In step S09, the control section 44 feeds the tape T in the +X direction by the first distance L1. FIG. 12 is a diagram illustrating a state in which the tape T is fed in the +X direction by the first distance L1 from a point in time when it is determined that the leading end of the tape T illustrated in FIG. 11 has passed the detection position. The first distance L1 is a length obtained by subtracting the margin distance ML from the sensor-head distance HS.

In step S10, the control section 44 switches the rotation direction of the feeding drive motor 45*a*. Here, the control section 44 switches the rotation direction of the feeding drive motor 45*a* from the second rotation direction to the first rotation direction.

In step S11, the control section 44 drives the printing head 26 while feeding the tape T in the −X direction.

In step S12, the control section 44 discriminates whether or not the printing is terminated. "Printing is terminated" means that the control based on the printed data is terminated. When the control section 44 determines that the printing is terminated, the control section 44 terminates the printing process. In addition, when the control section 44 determines that the printing is not terminated, the control section 44 returns to step S11.

Figure 7:
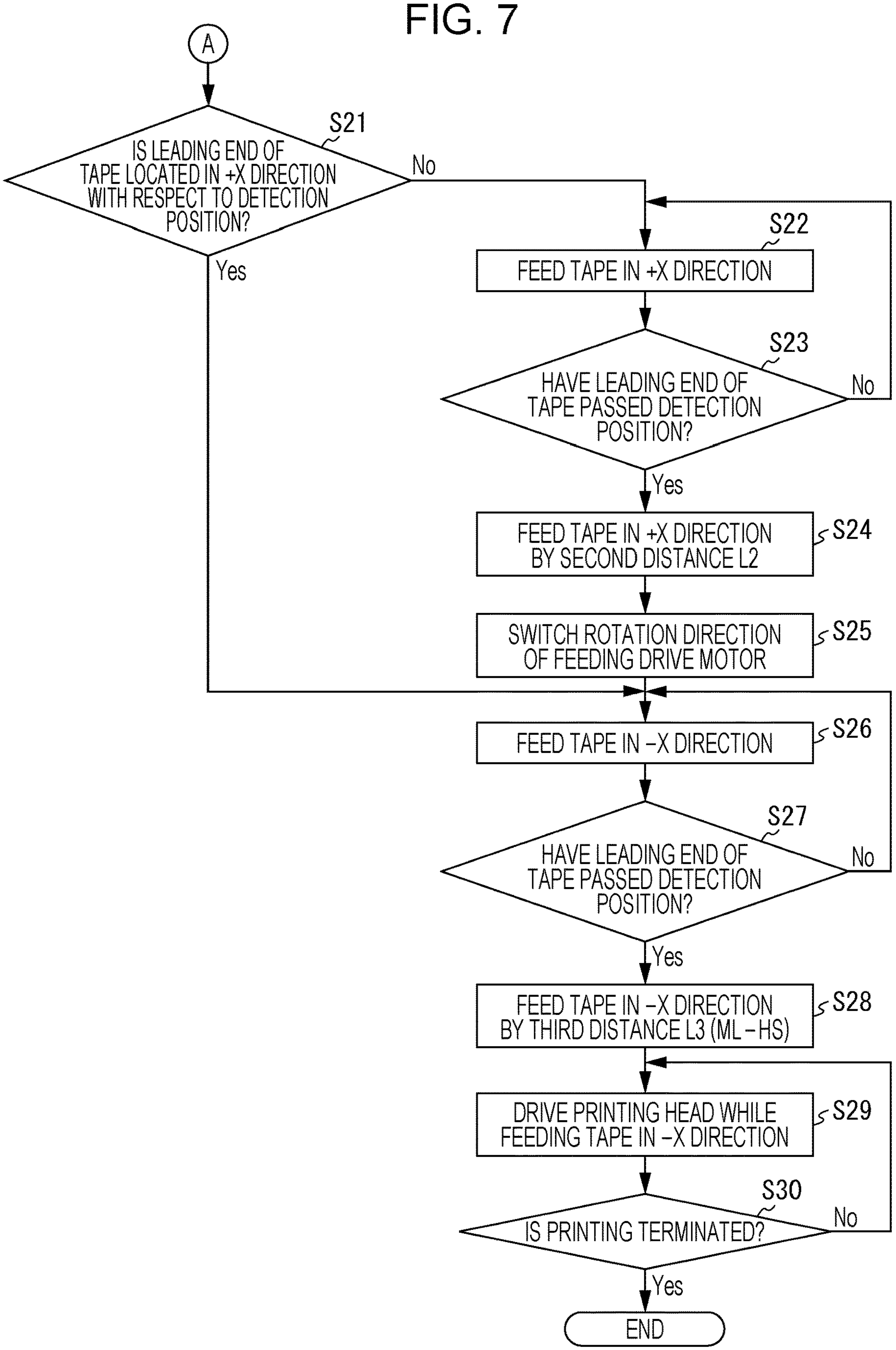
FIG. 7 is a flowchart following FIG. 6.

FIG. 7 is a diagram illustrating a process when the control section 44 determines that the margin distance ML is not shorter than the sensor-head distance HS, that is, the margin distance ML is equal to or longer than the sensor-head distance HS.

In step S21, the control section 44 discriminates whether or not the leading end of the tape T is located in the +X direction with respect to the detection position. FIG. 8 is a diagram illustrating a state in which the leading end of the tape T is located in the +X direction with respect to the detection position, and FIG. 13 is a diagram illustrating a state in which the leading end of the tape T is located in the −X direction with respect to the detection position. When the control section 44 determines that the leading end of the tape T is located in the +X direction with respect to the detection position, the control section 44 proceeds to step S26. In addition, when the control section 44 determines that the leading end of the tape T is not located in the +X direction with respect to the detection position, the control section 44 proceeds to step S22.

In step S22, the control section 44 feeds the tape T in the +X direction. The control section 44 rotates the feeding drive motor 45*a* in the second rotation direction to feed the tape T in the +X direction.

Figure 14:
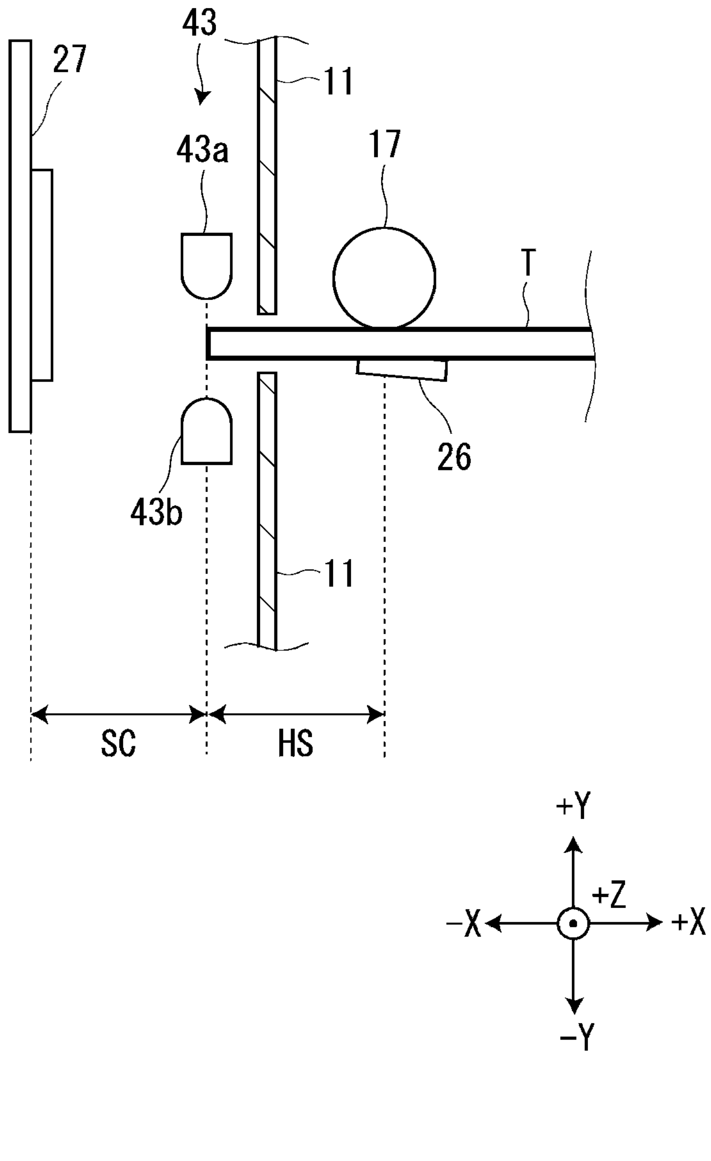
FIG. 14 is a diagram illustrating a state when the tape is fed in the +X direction from the state in FIG. 13 and the leading end of the tape has passed the detection position.

In step S23, the control section 44 discriminates whether or not the leading end of the tape T has passed the detection position. Here, when the detection result of the sensor 43 is changed from "there is a tape" to "there is no tape", the control section 44 determines that the leading end of the tape T has passed the detection position. FIG. 14 is a diagram illustrating a state when the leading end of the tape T has passed the detection position. When the control section 44 determines that the leading end of the tape T has passed the detection position, the control section 44 proceeds to step S24. In addition, when the control section 44 determines that the leading end of the tape T has not passed the detection position, the control section 44 returns to step S22.

Figure 15:
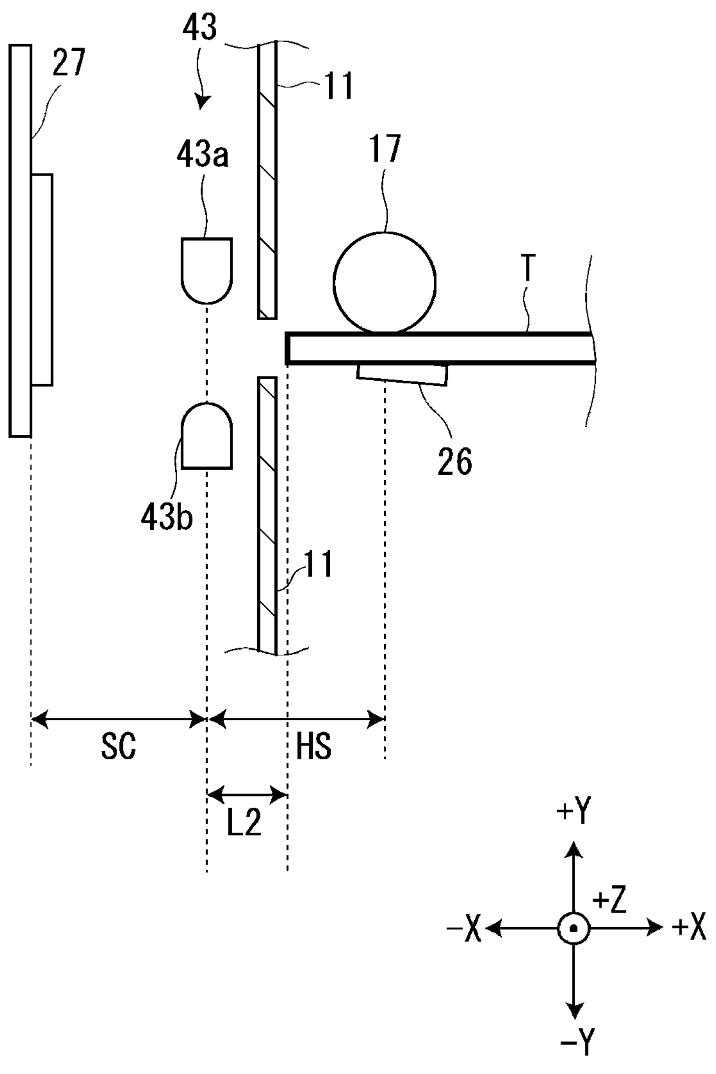
FIG. 15 is a diagram illustrating a state in which the tape is fed in the +X direction by the second distance from the state in FIG. 14.

In step S24, the control section 44 feeds the tape T in the +X direction by the second distance L2. FIG. 15 is a diagram illustrating a state in which the tape T is fed in the +X direction by the second distance L2 from a point in time when it is determined that the leading end of the tape T illustrated in FIG. 14 has passed the detection position.

In step S25, the control section 44 switches the rotation direction of the feeding drive motor 45*a*. Here, the control section 44 switches the rotation direction of the feeding drive motor 45*a* from the second rotation direction to the first rotation direction.

In step S26, the control section 44 feeds the tape T in the −X direction.

Figure 16:
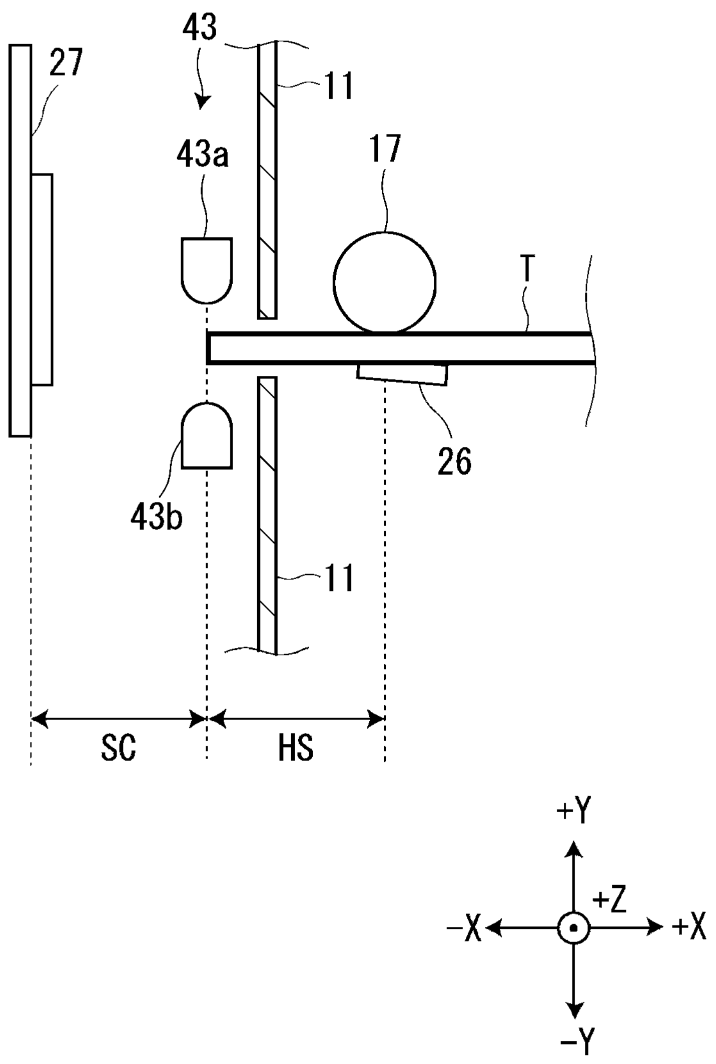
FIG. 16 is a diagram illustrating a state when the tape is fed in the −X direction from the state in FIG. 15 and the leading end of the tape has passed the detection position.

In step S27, the control section 44 discriminates whether or not the leading end of the tape T has passed the detection position. Here, when the detection result of the sensor 43 is changed from "there is no tape" to "there is a tape", the control section 44 determines that the leading end of the tape T has passed the detection position. FIG. 16 is a diagram illustrating a state when the leading end of the tape T has passed the detection position. When the control section 44 determines that the leading end of the tape T has passed the detection position, the control section 44 proceeds to step S28. In addition, when the control section 44 determines that the leading end of the tape T has not passed the detection position, the control section 44 returns to step S26.

Figure 17:
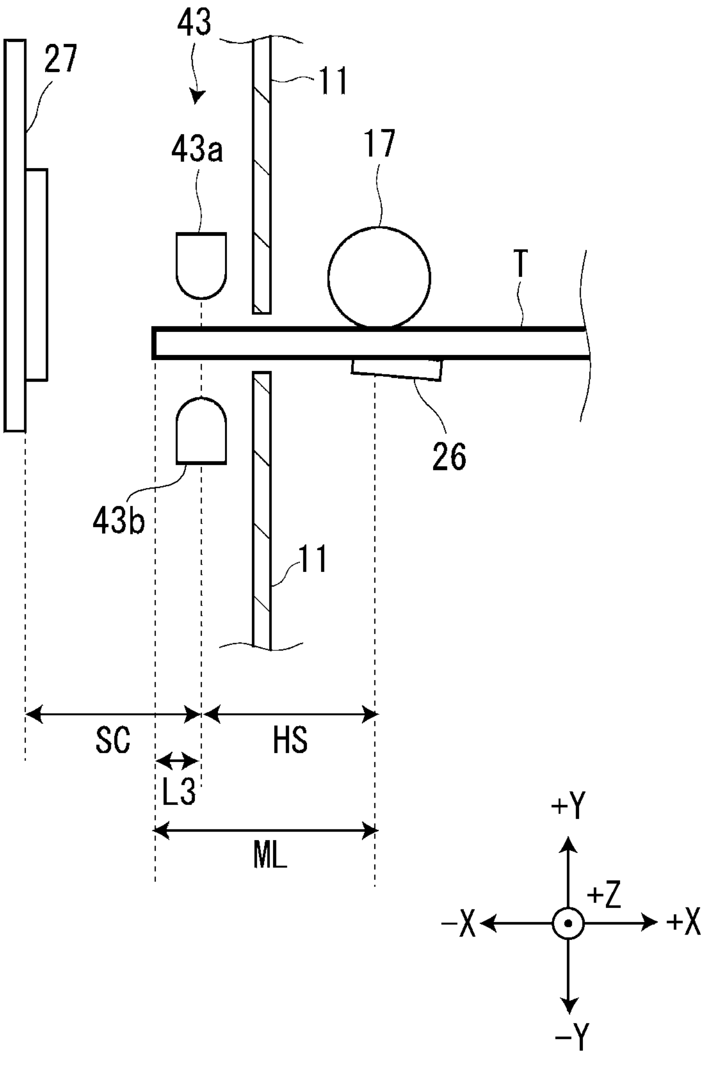
FIG. 17 is a diagram illustrating a state in which the tape is fed in the −X direction by a third distance from the state in FIG. 16.

In step S28, as illustrated in FIG. 17, the control section 44 feeds the tape T in the −X direction by a third distance L3 (L3≥0). FIG. 17 is a diagram illustrating a state in which the tape T is fed in the −X direction by the third distance L3 from a point in time when it is determined that the leading end of the tape T illustrated in FIG. 16 has passed the detection position. The third distance L3 is a length obtained by subtracting the sensor-head distance HS from the margin distance ML.

In step S29, the control section 44 drives the printing head 26 while feeding the tape T in the −X direction.

In step S30, the control section 44 discriminates whether or not the printing is terminated. When the control section 44 determines that the printing is terminated, the control section 44 terminates the printing process. In addition, when the control section 44 determines that the printing is not terminated, the control section 44 returns to step S29.

As described above, the tape printing apparatus 1 acquires the printing start command, and when the margin distance ML is shorter than the sensor-head distance HS, and the leading end of the tape T is located in the +X direction with respect to the detection position, the tape printing apparatus 1 feeds the tape T in the −X direction, locates the leading end of the tape T in the −X direction with respect to the detection position, and then feeds the tape T in the +X direction. Then, the tape printing apparatus 1 determines that the leading end of the tape T has passed the detection position in a period in which the tape T is fed in the +X direction, and then feeds the tape T in the +X direction until the printing start position of the tape T comes to the printing position. Therefore, since the tape printing apparatus 1 determines that the leading end of the tape T has passed the detection position after switching the feeding direction of the tape T, the tape printing apparatus 1 can suppress that the printing start position of the tape T is shifted from the printing position by the printing head 26 due to the influence of the backlash BL of the gear train mechanism 50 when the rotation direction of the feeding drive motor 45*a* is switched. Accordingly, the tape printing apparatus 1 can suppress an error in the margin distance ML of the tape T.

In addition, when the printing start command is acquired, when the margin distance ML is shorter than the sensor-head distance HS and the leading end of the tape T is located in the −X direction with respect to the detection position, the tape printing apparatus 1 does not feed the tape T in the −X direction, so that a time from the acquisition of the printing start command to the start of the driving of the printing head 26 can be reduced as much as possible.

In addition, the tape printing apparatus 1 feeds the tape T in the −X direction by the second distance L2 from the point in time when it is determined that the leading end of the tape T has passed the detection position in a period in which the tape T is fed in the −X direction, so that the leading end of the tape T can be reliably located in the −X direction with respect to the detection position of the sensor 43. In addition, since the second distance L2 is shorter than the sensor-cutter distance SC, the tape printing apparatus 1 can reduce a time from the acquisition of the printing start command to the start of the driving of the printing head 26 as much as possible.

In addition, since the tape printing apparatus 1 includes the cartridge mounting section 23, and the tape T is supplied from the tape cartridge C, the user can easily replace the tape T.

In addition, since the tape printing apparatus 1 uses the transmissive sensor as the sensor 43, the presence or absence of the tape T can be accurately detected regardless of the color or the material of the tape T.

The following modification examples can be adopted regardless of the embodiment described above.

Modification Example 1

When the printing start command is acquired, when the leading end of the tape T is located in the −X direction with respect to the detection position and the margin distance ML is longer than the sensor-head distance HS, the tape printing apparatus 1 may adopt the following modification examples.

The feeding amount in which the tape T is fed for locating the leading end of the tape T in the +X direction from the detection position may be a distance different from the second distance L2. That is, in step S24 of FIG. 7, the feeding amount in which the tape T is fed in the +X direction may be a distance different from the second distance L2.

In addition, the tape printing apparatus 1 may omit steps S24 to S27 in FIG. 7. In this configuration, in the tape printing apparatus 1, the printing result is affected by the backlash BL of the gear train mechanism 50 when the rotation direction of the feeding drive motor 45*a* is switched from the second rotation direction to the first rotation direction, but the process time from the acquisition of the printing start command to the termination of the printing process can be reduced. In addition, even when the influence of the backlash BL of the gear train mechanism 50 is received, the margin distance ML is longer than the sensor-head distance HS, so that there is no significant hindrance in the printing result.

Modification Example 2

The tape printing apparatus 1 does not have to be configured such that the tape cartridge C can be mounted. For example, the tape printing apparatus 1 may include a platen roller and perform the printing on the tape T supplied from an outside of the tape printing apparatus 1.

Modification Example 3

The sensor 43 may be a reflective sensor, instead of the transmissive sensor.

Modification Example 4

The "cutter" may be a half cutter, instead of the full cutter 27. The half cutter is a cutter that cuts only the printing tape in the tape T formed of the printing tape and the release paper tape in the Z axis direction.

In addition, the tape printing apparatus 1 may have a configuration including the full cutter 27 and the half cutter. In this case, the tape printing apparatus 1 may use the half cutter to form a guide for easily releasing the release paper tape from the printing tape at the end portion of the tape T in the −X direction. That is, the tape printing apparatus 1 need only provide a margin area as the guide at the end portion of the tape T in the −X direction, and cut an end portion of the margin area in the +X direction by using the half cutter. It is preferable that whether or not to provide the margin area at the end portion of the tape T in the −X direction is determined based on a setting of the user.

Modification Example 5

The tape printing apparatus 1 locates the leading end of the tape T in the −X direction with respect to the detection position by feeding the tape T in the −X direction and feeding the tape T in the −X direction by the second distance L2 after the leading end of the tape T has passed the detection position, but may locate the leading end of the tape T in the −X direction with respect to the detection position by feeding the tape T in the −X direction by a certain distance after the printing start command is acquired. In this case, a certain distance is a distance at which the leading end of the tape T is reliably located in the −X direction with respect to the detection position, and is preferably a distance longer than a distance between the tape sending-out port 13 of the cartridge case 11 and the detection position of the sensor 43. For example, a certain distance may be the sensor-head distance HS.

Modification Example 6

The firmware of the tape printing apparatus 1 may be provided to a customer as a program. In addition, a storage medium in which the firmware of the tape printing apparatus 1 is recorded may be provided to the customer. In addition, the tape printing apparatus 1 may use another printing method, such as an ink jet method, in addition to a thermal transfer method. Other configurations can be changed as appropriate without departing from the gist of the present disclosure.

ADDITIONAL NOTE

Hereinafter, the tape printing apparatus and the control method of the tape printing apparatus will be additionally noted.

Provided is a tape printing apparatus 1 including: a feeding drive motor 45*a* that rotates in a first rotation direction and a second rotation direction opposite to the first rotation direction; a platen drive shaft 25 that engages with a platen roller 17 and rotates the platen roller 17; a gear train mechanism 50 that transmits power of the feeding drive motor 45*a* to the platen drive shaft 25 so that the platen roller 17 feeds a tape T in a −X direction when the feeding drive motor 45*a* rotates in the first rotation direction, and the platen roller 17 feeds the tape T in a +X direction opposite to the −X direction when the feeding drive motor 45*a* rotates in the second rotation direction; a printing head 26 that performs printing on the tape T fed in the −X direction; a sensor 43 that has a detection position located in the −X direction with respect to a printing position by the printing head 26 and detects presence or absence of the tape T at the detection position; and a control section 44 that controls the feeding drive motor 45*a* and the printing head 26, in which the control section 44 acquires a printing start command, and when a margin distance ML, which is a distance from a leading end of the tape T to a printing start position of the tape T, is shorter than a sensor-head distance HS, which is a distance between the detection position and the printing position, and the leading end of the tape T is located in the +X direction with respect to the detection position, the control section 44 feeds the tape T in the −X direction, locates the leading end of the tape T in the −X direction with respect to the detection position by a second distance L2, feeds the tape T in the +X direction, determines that the leading end of the tape T has passed the detection position, and then feeds the tape T in the +X direction until the printing start position of the tape T comes to the printing position.

Provided is a control method of a tape printing apparatus 1 including: a feeding drive motor 45*a* that rotates in a first rotation direction and a second rotation direction opposite to the first rotation direction; a platen drive shaft 25 that engages with a platen roller 17 and rotates the platen roller 17; a gear train mechanism 50 that transmits power of the feeding drive motor 45*a* to the platen drive shaft 25 so that the platen roller 17 feeds a tape T in a −X direction when the feeding drive motor 45*a* rotates in the first rotation direction, and the platen roller 17 feeds the tape T in a +X direction opposite to the −X direction when the feeding drive motor 45*a* rotates in the second rotation direction; a printing head 26 that performs printing on the tape T fed in the −X direction; and a sensor 43 that has a detection position located in the −X direction with respect to a printing position by the printing head 26 and detects presence or absence of the tape T at the detection position, the control method including: causing the tape printing apparatus 1 to acquire a printing start command and to, when a margin distance ML, which is a distance from a leading end of the tape T to a printing start position of the tape T, is shorter than a sensor-head distance HS, which is a distance between the detection position and the printing position, and the leading end of the tape T is located in the +X direction with respect to the detection position, feed the tape T in the −X direction, locates the leading end of the tape T in the −X direction with respect to the detection position by a second distance L2, feed the tape T in the +X direction, determines that the leading end of the tape T has passed the detection position, and then feed the tape T in the +X direction until the printing start position of the tape T comes to the printing position.

In this configuration, the tape printing apparatus 1 determines that the leading end of the tape T has passed the detection position after switching the feeding direction of the tape T from the −X direction to the +X direction. Therefore, the tape printing apparatus 1 can suppress that the printing start position of the tape T is shifted from the printing position by the printing head 26 due to the influence of the backlash BL of the gear train mechanism 50 when the rotation direction of the feeding drive motor 45*a* is switched. Accordingly, the tape printing apparatus 1 can suppress an error in the margin distance ML of the tape T.

In the tape printing apparatus 1, it is preferable that the control section 44 acquires the printing start command, and when the margin distance ML is shorter than the sensor-head distance HS and the leading end of the tape T is located in the −X direction with respect to the detection position, the control section 44 feeds the tape T in the +X direction, determines that the leading end of the tape T has passed the detection position, and then feeds the tape T in the +X direction until the printing start position of the tape T comes to the printing position.

In this configuration, when the printing start command is acquired and the leading end of the tape T is located in the −X direction with respect to the detection position, the tape printing apparatus 1 does not feed the tape T in the −X direction, so that a time from the acquisition of the printing start command to the start of the driving of the printing head 26 can be reduced as much as possible.

It is preferable that the tape printing apparatus 1 further includes a cutter that has a cutting position located in the −X direction with respect to the detection position and cuts the tape T in a tape T width direction, in which the second distance L2 is shorter than a distance between the detection position and the cutting position.

In this configuration, the second distance L2 is shorter than the distance between the detection position of the sensor 43 and the cutting position by the cutter, so that the tape printing apparatus 1 can reduce a time from the acquisition of the printing start command to the start of the driving of the printing head 26 as much as possible.

It is preferable that the tape printing apparatus 1 further includes a cartridge mounting section 23 on which a tape cartridge C that accommodates a tape core 15 around which the tape T is wound and the platen roller 17 is detachably mounted, in which the platen drive shaft 25 engages with the platen roller 17 accommodated in the tape cartridge C.

In this configuration, the tape printing apparatus 1 can suppress the error in the margin distance ML of the tape T even when the tape T is supplied from the tape cartridge C.

In the tape printing apparatus 1, it is preferable that the sensor 43 is a transmissive sensor including a light emission section 43*a* and a light reception section 43*b* provided at a position facing the light emission section 43*a*.

In this configuration, the transmissive sensor is used, so that the tape printing apparatus 1 can accurately detect the presence or absence of the tape T regardless of the color and the material of the tape T.

What is claimed is:

1. A tape printing apparatus comprising:

a drive motor that rotates in a first rotation direction and a second rotation direction opposite to the first rotation direction;

a platen drive shaft that engages with a platen roller and rotates the platen roller;

a gear train mechanism that transmits power of the drive motor to the platen drive shaft so that the platen roller feeds a tape in a first feeding direction when the drive motor rotates in the first rotation direction, and the platen roller feeds the tape in a second feeding direction opposite to the first feeding direction when the drive motor rotates in the second rotation direction;

a printing head that performs printing on the tape fed in the first feeding direction;

a sensor that has a detection position located in the first feeding direction with respect to a printing position by the printing head and detects presence or absence of the tape at the detection position; and a control section that controls the drive motor and the printing head, wherein the control section acquires a printing start command, and when a margin distance, which is a distance from a leading end of the tape to a printing start position of the tape, is shorter than a sensor-head distance, which is a distance between the detection position and the printing position, and the leading end of the tape is located in the second feeding direction with respect to the detection position, the control section feeds the tape in the first feeding direction, locates the leading end of the tape in the first feeding direction with respect to the detection position by a predetermined distance, feeds the tape in the second feeding direction, determines that the leading end of the tape passed the detection position, and then feeds the tape in the second feeding direction until the printing start position of the tape comes to the printing position.

2. The tape printing apparatus according to claim 1, wherein the control section acquires the printing start command, and when the margin distance is shorter than the sensor-head distance and the leading end of the tape is located in the first feeding direction with respect to the detection position, the control section feeds the tape in the second feeding direction, determines that the leading end of the tape passed the detection position, and then feeds the tape in the second feeding direction until the printing start position of the tape comes to the printing position.

3. The tape printing apparatus according to claim 1, further comprising:

a cutter that has a cutting position located in the first feeding direction with respect to the detection position and cuts the tape in a tape width direction, wherein the predetermined distance is shorter than a distance between the detection position and the cutting position.

4. The tape printing apparatus according to claim 1, further comprising:

a cartridge mounting section on which a tape cartridge that accommodates a tape core around which the tape is wound and the platen roller is detachably mounted, wherein the platen drive shaft engages with the platen roller accommodated in the tape cartridge.

5. The tape printing apparatus according to claim 1, wherein the sensor is a transmissive sensor including a light emission section and a light reception section provided at a position facing the light emission section.

6. A control method of a tape printing apparatus including:

a drive motor that rotates in a first rotation direction and a second rotation direction opposite to the first rotation direction;

a platen drive shaft that engages with a platen roller and rotates the platen roller;

a gear train mechanism that transmits power of the drive motor to the platen drive shaft so that the platen roller feeds a tape in a first feeding direction when the drive motor rotates in the first rotation direction, and the platen roller feeds the tape in a second feeding direction opposite to the first feeding direction when the drive motor rotates in the second rotation direction;

a printing head that performs printing on the tape fed in the first feeding direction; and a sensor that has a detection position located in the first feeding direction with respect to a printing position by the printing head and detects presence or absence of the tape at the detection position, the control method comprising:

causing the tape printing apparatus to acquire a printing start command and to, when a margin distance, which is a distance from a leading end of the tape to a printing start position of the tape, is shorter than a sensor-head distance, which is a distance between the detection position and the printing position, and the leading end of the tape is located in the second feeding direction with respect to the detection position, feed the tape in the first feeding direction, locates the leading end of the tape in the first feeding direction with respect to the detection position by a predetermined distance, feed the tape in the second feeding direction, determine that the leading end of the tape passed the detection position, and then feed the tape in the second feeding direction until the printing start position of the tape comes to the printing position.

* * * * *